T. E. MURRAY.
METAL VEHICLE WHEEL.
APPLICATION FILED MAR. 2, 1916.
1,212,801.
Patented Jan. 16, 1917
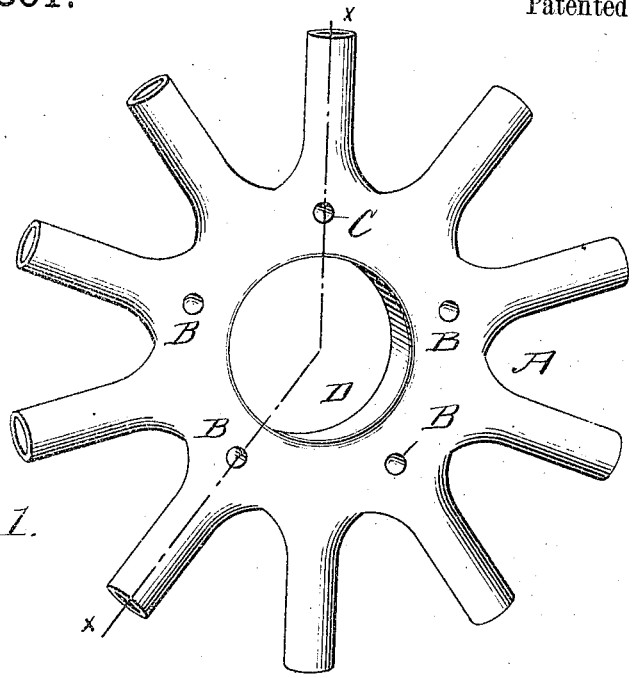
Fig. 1.
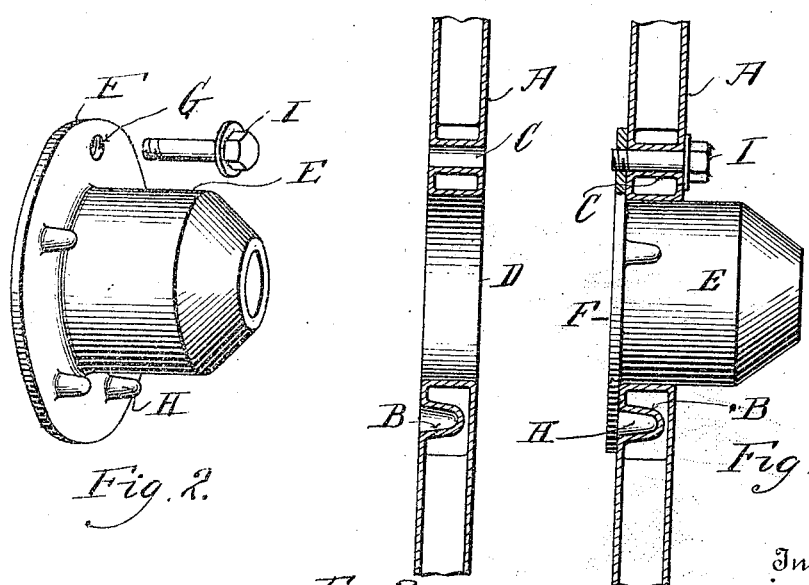
Fig. 2.
Fig. 3.
Fig. 4.
Inventor
Thomas E. Murray
By his Attorney
Park Benjamin

UNITED STATES PATENT OFFICE.

THOMAS E. MURRAY, OF NEW YORK, N. Y.

METAL VEHICLE-WHEEL.

1,212,801.  Specification of Letters Patent.  Patented Jan. 16, 1917.

Application filed March 2, 1916. Serial No. 81,586.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention is a demountable metal vehicle wheel, which can be detached from and slid outwardly off of its hub by the removal of a single bolt.

The invention consists in the construction more particularly hereinafter described and claimed.

In the accompanying drawings—Figure 1 is a face view of the nave and the inner portions of the spokes thereon. Fig. 2 is a perspective view of the hub and removable fastening bolt. Fig. 3 is a section on the line $x$, $x$ of Fig. 1. Fig. 4 is a similar section, showing the nave secured to the hub.

Similar letters of reference indicate like parts.

The nave A is hollow and the spokes are preferably tubular and may be integral with said body. On one face of said nave are a number of struck up sockets B—here four—and extending between the opposite sides of and within said body is a tube C open at both ends. The sockets B and tube C are preferably disposed symmetrically around the hub opening D.

The cylindrical hub E has a flange F, in which is a threaded opening G, and on which are as many struck up studs H as there are sockets B. When the nave A is placed on the hub E, the studs H enter the sockets B, and the tube C and opening G register, so that a headed bolt I may be placed in the tube C, with its threaded extremity engaging in the threaded opening G. The bolt I serves to secure hub and nave together, and the studs H entering the sockets B prevent rotation of the nave on the hub.

It will be obvious that the wheel body can be demounted from the hub by removing the bolt I from the opening in the hub flange, and then sliding the wheel outwardly off of the hub.

I claim:

1. A demountable metal vehicle wheel, comprising a hollow nave having a central opening for receiving a hub, spokes on said nave, sockets in one face of said nave disposed around said hub opening, a cylindrical hub entering said opening, a flange on said hub, projections on said flange entering said sockets, and a removable bolt securing said flange to said nave.

2. A demountable metal vehicle wheel, comprising a hollow nave having a central opening for receiving a hub, spokes on said nave, struck up sockets in one face of said nave disposed around said hub opening, a cylindrical hub entering said opening, a flange on said hub, struck up projections on said flange entering said sockets, and a removable bolt securing said flange to said nave.

3. A demountable metal vehicle wheel, comprising a hollow nave having a central opening for receiving a hub, spokes on said nave, struck up sockets in one face of said nave disposed around said hub opening, a cylindrical hub entering said opening, a flange on said hub having a threaded opening, struck up projections on said flange entering said sockets, and a bolt headed at one end and threaded near the other end, passing through said nave and entering said threaded flange opening.

4. A demountable metal vehicle wheel, comprising a hollow nave of thin metal having a central opening for receiving a hub, spokes on said nave, struck up sockets in one face of said nave disposed around said hub opening, a cylindrical hub entering said opening, a flange on said hub having a threaded opening, struck up projections on said flange entering said sockets, an interior tube secured in and extending from face to face of said nave and open at both extremities, and a bolt headed at one end and threaded near the other end, passing through said tube and entering said threaded flange opening.

In testimony whereof I have affixed my signature in presence of two witnesses.

THOMAS E. MURRAY.

Witnesses:
GERTRUDE T. PORTER,
MAY T. McGARRY.